United States Patent
Kang

(10) Patent No.: US 11,683,856 B2
(45) Date of Patent: Jun. 20, 2023

(54) CONNECTION CONTROL METHOD AND DEVICE

(71) Applicant: VIVO MOBILE COMMUNICATION CO.,LTD., Guangdong (CN)

(72) Inventor: Yanchao Kang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/969,519

(22) PCT Filed: Feb. 2, 2019

(86) PCT No.: PCT/CN2019/074567
§ 371 (c)(1),
(2) Date: Aug. 12, 2020

(87) PCT Pub. No.: WO2019/154361
PCT Pub. Date: Aug. 15, 2019

(65) Prior Publication Data
US 2020/0404741 A1    Dec. 24, 2020

(30) Foreign Application Priority Data
Feb. 12, 2018   (CN) .......................... 201810146855.3

(51) Int. Cl.
*H04W 76/50*     (2018.01)
(52) U.S. Cl.
CPC .................................. *H04W 76/50* (2018.02)
(58) Field of Classification Search
CPC ................................................... H04W 76/50
See application file for complete search history.

(56) References Cited

U.S. PATENT DOCUMENTS

| | | | | |
|---|---|---|---|---|
| 2011/0009155 | A1* | 1/2011 | Choumaru | H04W 52/0241 455/522 |
| 2011/0201343 | A1* | 8/2011 | Pinheiro | H04W 76/27 455/450 |
| 2012/0002545 | A1 | 1/2012 | Watfa et al. | |
| 2015/0181404 | A1 | 6/2015 | Hietalahti et al. | |
| 2016/0100362 | A1 | 4/2016 | Palanisamy et al. | |
| 2016/0205625 | A1 | 7/2016 | Stojanovski et al. | |
| 2020/0236534 | A1* | 7/2020 | Wang | H04W 68/02 |

(Continued)

FOREIGN PATENT DOCUMENTS

| | | |
|---|---|---|
| CN | 102843754 A | 12/2012 |
| CN | 102893668 A | 1/2013 |

(Continued)

OTHER PUBLICATIONS

LG Electronics,"P-CR23.501ClarificationonMICOmode," SAWG2Meeting#124S2-179005, pp. 1-2, (Dec. 4, 2017) (Year: 2017).*

(Continued)

*Primary Examiner* — Muthuswamy G Manoharan
(74) *Attorney, Agent, or Firm* — Maschoff Brennan

(57) ABSTRACT

Embodiments of the present disclosure provide a connection control method and device. The method includes: establishing a session connection with a network device, where the session connection is for emergency service; de-activating a mobile initiated connection only (MICO) mode locally at the UE.

20 Claims, 4 Drawing Sheets

(56) References Cited

U.S. PATENT DOCUMENTS

2021/0168901 A1* 6/2021 Kim ..................... H04W 76/25

FOREIGN PATENT DOCUMENTS

CN         107431981 A    12/2017
WO    2012/089368 A1    7/2012

OTHER PUBLICATIONS

3rd Generation Partnership Project; Technical Specification Group Core Network and Terminals; Non-Access-Stratum (NAS) protocol for 5G System (5Gs); Stage 3 (Release 15), 3GPP TSG TS 24.501 v0.3.1 (Feb. 2018).
EP Search Report in Application No. 19751457.3 dated Mar. 15, 2021.
CN Office Action in Application No. 201810146855.3 dated May 12, 2021.
LG Electronics, "TS 23.501: Update to RRC-Inactive," SA WG2 Meeting #122 S2-174417, pp. 1-7, (Jun. 30, 2017).
LG Electronics, "P-CR 23.501 Clarification on MICO mode," SA WG2 Meeting #124 S2-179005, pp. 1-2, (Dec. 4, 2017).
Vivo, "Local deactivation of MICO mode for emergency services," 3GPP TSG-SA WG2 Meeting #126 S2-181602, pp. 1-2, (Feb. 13, 2018).
Written Opinion of the International Searching Authority dated Apr. 28, 2019 as received in Application No. PCT/CN2019/074567.
CN Office Action dated Oct. 20, 2020 as received in Application No. 201810146855.3.

* cited by examiner

CONNECTION CONTROL METHOD AND DEVICE

CROSS-REFERENCE TO RELATED APPLICATION

This application is the U.S. national phase of PCT Application PCT/CN2019/074567 filed on Feb. 2, 2019, which claims the benefit and priority of Chinese Application No. 201810146855.3, filed on Feb. 12, 2018, which is incorporated herein by reference in its entirety.

TECHNICAL FIELD

Embodiments of the present disclosure relate to the field of communication technologies, and in particular to a connection control method and device.

BACKGROUND

When a mobile initiated connection only (MICO) mode has been activated in a terminal device such as a user equipment (UE), after a protocol data unit (PDU) session establishment process for emergency services is completed, if in a connection management connected (CM-CONNECTED) state, the UE needs to negotiate with a network device to de-activate the MICO mode through an explicit signaling registration update procedure.

However, this way of de-activating the MICO mode requires explicit signaling interactions between the UE and the network device, and the increase in the number of signaling interactions can reduce stability of the system.

BRIEF DESCRIPTION OF THE DRAWINGS

By reading detailed description of the following optional embodiments, various other advantages and benefits will become clear to those skilled in the art. The drawings are only for the purpose of illustrating the optional embodiments and are not considered to be a limitation of the present disclosure. Further, throughout the drawings, the same reference symbols are used to denote the same parts. In the drawing.

DETAILED DESCRIPTION

Figure 1:
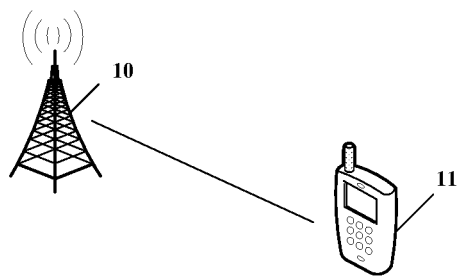
FIG. 1 is a schematic diagram of an architecture of a wireless communication system according to an embodiment of the present disclosure.

The technical solutions in embodiments of the present disclosure will be described hereinafter in a clear and complete manner in conjunction with the drawings in the embodiments of the present disclosure. The following embodiments are merely a part of, rather than all of, the embodiments of the present disclosure, and based on these embodiments, a person skilled in the art may obtain other embodiments, which also fall within the scope of the present disclosure.

The terms "include" or its variations in the specification and claims of the present application are intended to encompass a non-exclusive inclusion, such that a process, method, system, product, or device that include a series of steps or units include not only those steps or units but also other steps or units that are not explicitly listed, or steps or units that are inherent to such process, method, product, or device. In addition, "and/or" used in the specification and claims of the present application means at least one of connected objects, for example, A and/or B, means that there are three cases of including a single A, including a single B, and including both A and B.

In the embodiments of the present disclosure, the terms "exemplary" or "for example" are used as examples, instances or illustrations. Any embodiment or design scheme described in the embodiments of the present disclosure as "exemplary" or "for example" should not be construed as being more preferred or advantageous than other embodiments or design scheme. Specifically, the terms such as "exemplary" or "for example" are intended to present concepts in a specific way.

Embodiments of the present disclosure is provide a connection control method and device, which can mitigate the problem of low system stability caused by too many signaling interactions between the UE and the network device.

According to a first aspect, a connection control method is provided. The method is applied to a user equipment (UE) and includes: establishing a session connection with a network device; wherein the session connection is for emergency service; de-activating a mobile initiated connection only (MICO) mode locally at the UE.

According to a second aspect, a connection control method is provided. The method is applied to a network device and includes: establishing a session connection with a user equipment (UE); wherein the session connection is for emergency service; de-activating a mobile initiated connection only (MICO) mode locally at the network device.

According to a third aspect, a user equipment (UE) is provided and includes: a first establishment module configured to establish a session connection with a network device; wherein the session connection is for emergency service; a first deactivation module configured to de-activate a mobile initiated connection only (MICO) mode locally at the UE.

According to a fourth aspect, a network device is provided and includes: a second establishment module configured to establish a session connection with a user equipment (UE); wherein the session connection is for emergency service; a second deactivation module configured to de-activate a mobile initiated connection only (MICO) mode locally at the network device.

According to a fifth aspect, a user equipment is provided and includes: processor, a memory, and a computer program stored on the memory and executable on the processor; wherein the computer program is executed by the processor to implement steps of the above connection control method.

According to a sixth aspect, a network device is provided and includes: processor, a memory, and a computer program stored on the memory and executable on the processor; wherein the computer program is executed by the processor to implement steps of the above connection control method.

According to a seventh aspect, a computer readable storage medium is provided and includes a computer program stored thereon; wherein the computer program is executed by a processor to implement steps of the above connection control method.

In an embodiment, after an emergency service session connection is established, the UE or the network device locally de-activates the MICO mode according to the agreement with the network device or the UE, thereby preventing the UE and the network device from de-activating the MICO mode through explicit signaling interactions, reducing the number of signaling interactions between the UE and the network device, and improving stability of the system.

In order to better understand the technical solutions of the embodiments of the present disclosure, the mobile initiated connection only (MICO) mode is first introduced.

The UE may indicate a preference for the MICO mode to the network during an initial registration procedure or a registration update procedure. Based on local configuration, predicted UE behavior (if available), UE-indicated preference, UE subscription information and network policies or any combination of them, an access and mobility management function (AMF) entity determines whether to allow the UE to use the MICO mode and indicates it to the UE in a registration accept message. If the UE does not receive an MICO mode indication transmitted by the network in the registration accept message, the AMF and UE should not activate the MICO mode.

The UE and the AMF renegotiate the MICO mode during each subsequent registration procedure. When the UE is in the connection management (CM) connected state, the AMF may trigger a registration update procedure to de-activate the MICO mode through a UE configuration update procedure.

The AMF allocates a registration area to the UE during a registration procedure. When the AMF indicates the MICO mode to the UE, the registration area is not limited by the size of a paging area. If a serving area of the AMF is the entire public land mobile network (PLMN), based on the local policy and subscription information, the AMF may determine to provide all PLMN registration areas for the UE. In this case, re-registration to the same PLMN due to mobility is not applicable.

For the mobility restrictions of the UE in the MICO mode, the AMF needs to allocate allowed area/disallowed area to the UE according to the protocol.

When the AMF indicates the MICO mode to the UE, if the CM status of the UE in the AMF is CM-idle, then the AMF considers that the UE is always unreachable. The AMF rejects any downlink data transfer request of the UE in the MICO mode, and indicates that the UE is in an unreachable state. For a mobile downlink short message through Non-Access Stratum (NAS), the AMF notifies that the UE is unreachable through a short message function (SMSF), and then performs an unsuccessful downlink short message transmission procedure described in the protocol. The AMF also needs to postpone location services and so on. When the UE is in a CM-CONNECTED state, the UE in the MICO mode can be used for transmission of downlink and uplink data or signaling.

The UE in the MICO mode does not need to monitor paging during CM-IDLE. The UE in the MICO mode can stop any access stratum procedure in the CM-IDLE state. When one of the following triggers occurs, the UE can leave the MICO mode and initiate a transition from CM-IDLE to CM-CONNECTED:

(1) UE changes (i.e., configuration changes) and needs to update its registration with the network;
(2) a periodic registration timer expires;
(3) there is uplink data to be transmitted;
(4) there is uplink signaling to be transmitted.

If a registration area that is not the "all PLMN" registration area is allocated to the UE in MICO mode, the UE determines whether it is in the registration area when it has mobile originating (MO) data or MO signaling. If the UE is not in the registration area, the UE needs to initiate a registration update procedure.

Embodiments of the present disclosure will be described hereinafter in connection with the accompanying drawings. A connection control method and device provided in the embodiments of the present disclosure may be applied to a wireless communication system. The wireless communication system may be a system adopting the fifth generation (5G) mobile communication technology (hereinafter referred to as 5G system), or an evolved long term evolution (eLTE) system, or a subsequent evolved communication system. Referring to FIG. 1, FIG. 1 is a schematic diagram of an architecture of a wireless communication system according to an embodiment of the present disclosure. As shown in FIG. 1, the wireless communication system may include a network device 10 and a user equipment. For example, the user equipment is recorded as UE 11, and the UE 11 can communicate with the network device 10. In practical application, connection between the above various devices may be wireless connection. In order to easily and intuitively represent the connection relationship between the various devices, solid lines are used in FIG. 1.

It should be noted that the above communication system may include multiple UEs, and the network device may communicate with multiple UEs (for transmitting signaling or transmitting data). The network device provided in the embodiments of the present disclosure may be an AMF entity or other devices. In some embodiments such other devices may encompass an AMF entity.

The user equipment provided in the embodiments of the present disclosure may be a mobile phone, a tablet computer, a notebook computer, an ultra-mobile personal computer (UMPC), a netbook or a personal digital assistant (PDA), etc.

Figure 2:
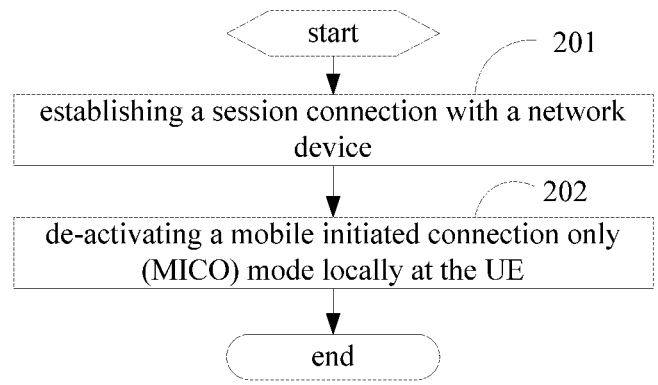
FIG. 2 is a first flowchart of a connection control method according to an embodiment of the present disclosure.

Referring to FIG. 2, FIG. 2 is a flowchart of a connection control method according to an embodiment of the present disclosure. The method is executed by a UE, and includes the following steps.

Step 201: establishing a session connection with a network device.

In one embodiment of the present disclosure, the session connection is for emergency services. The session connection may be a protocol data unit (PDU) session connection.

In one embodiment of the present disclosure, the network device may be an access and mobility management function (AMF), which is not limited thereto.

Step 202: de-activating a mobile initiated connection only (MICO) mode locally at the UE.

In this way, after the emergency service session connection is established, if the MICO mode is negotiated to be activated during the most recent registration procedure, the UE de-activates the MICO mode according to the agreement with the network device, thereby preventing the UE and the network device from de-activating the MICO mode through explicit signaling interactions, reducing the number of signaling interactions between the UE and the network device, and improving stability of the system.

Figure 3:
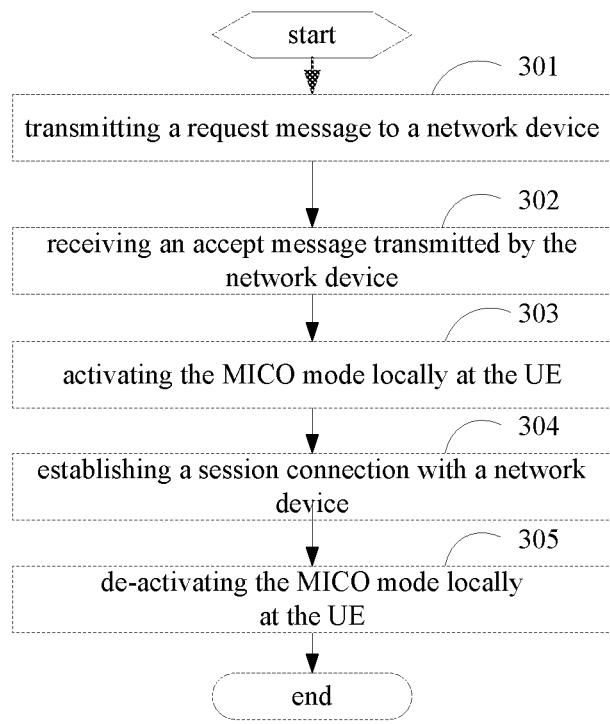
FIG. 3 is a second flowchart of a connection control method according to an embodiment of the present disclosure.

Referring to FIG. 3, FIG. 3 is another flowchart of a connection control method according to an embodiment of the present disclosure. The method is executed by a UE, and includes the following steps.

Step 301: transmitting a request message to a network device.

In one embodiment of the present disclosure, the request message is used to request for activating a mobile initiated connection only (MICO) mode.

In one embodiment of the present disclosure, the network device may be an access and mobility management function (AMF), which is not limited thereto.

Step 302: receiving an accept message transmitted by the network device.

In one embodiment of the present disclosure, the accept message includes indication information for MICO (or referred to as MICO indication information). The indication information indicates that the network device accepts the UE's request for activating the MICO mode.

Step 303: activating the MICO mode locally at the UE.

In one embodiment of the present disclosure, the MICO mode is activated through the registration procedure in the step 302 and the step 303.

Step 304: establishing a session connection with a network device.

In one embodiment of the present disclosure, the session connection is for emergency services. Optionally, the session connection may be a protocol data unit (PDU) session connection.

Step 305: de-activating the MICO mode locally at the UE.

After the emergency service session connection is established, if the MICO mode is negotiated to be activated during the most recent registration procedure, the UE de-activates the MICO mode according to the agreement with the network device, thereby preventing the UE and the network device from de-activating the MICO mode through explicit signaling interactions, reducing the number of signaling interactions between the UE and the network device, and improving stability of the system.

Figure 4:
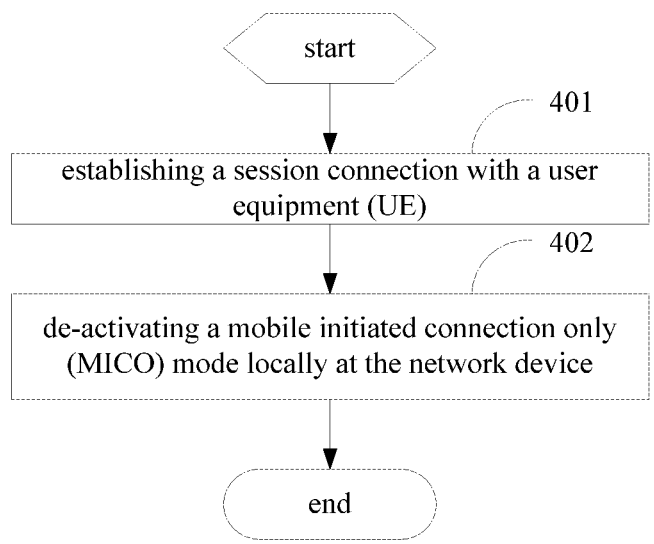
FIG. 4 is a third flowchart of a connection control method according to an embodiment of the present disclosure.

Referring to FIG. 4, FIG. 4 is a flowchart of a connection control method according to an embodiment of the present disclosure. The method is executed by a network device such as an access and mobility management function (AMF), and includes the following steps.

Step 401: establishing a session connection with a user equipment (UE).

In one embodiment of the present disclosure, the session connection is for emergency services. Optionally, the session connection may be a protocol data unit (PDU) session connection.

Step 402: de-activating a mobile initiated connection only (MICO) mode locally at the network device.

After the emergency service session connection is established, if the MICO mode is negotiated to be activated during the most recent registration procedure, the network device de-activates the MICO mode according to the agreement with the UE, thereby preventing the UE and the network device from de-activating the MICO mode through explicit signaling interactions, reducing the number of signaling interactions between the UE and the network device, and improving stability of the system.

Figure 5:
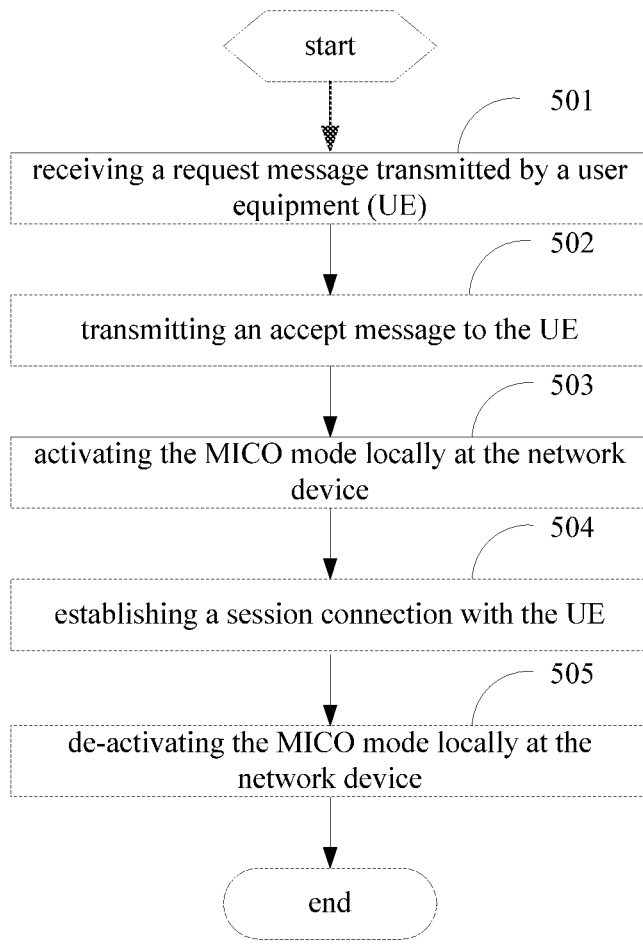
FIG. 5 is a fourth flowchart of a connection control method according to an embodiment of the present disclosure.

Referring to FIG. 5, FIG. 5 is another flowchart of a connection control method according to an embodiment of the present disclosure. The method is executed by a network device such as an access and mobility management function (AMF), and includes the following steps.

Step 501: receiving a request message transmitted by a user equipment (UE), where the request message is configured to request for activating a mobile initiated connection only (MICO) mode.

Step 502: transmitting an accept message to the UE.

In one embodiment of the present disclosure, the accept message includes MICO indication information. The indication information indicates that the network device accepts the UE's request for activating the MICO mode.

Step 503: activating the MICO mode locally at the network device.

Step 504: establishing a session connection with the UE.

In one embodiment of the present disclosure, the session connection is for emergency services.

Step 505: de-activating the MICO mode locally at the network device.

After the emergency service session connection is established, if the MICO mode is negotiated to be activated during the most recent registration procedure, the network device de-activates the MICO mode according to the agreement with the UE, thereby preventing the UE and the network device from de-activating the MICO mode through explicit signaling interactions, reducing the number of signaling interactions between the UE and the network device, and improving stability of the system.

Figure 6:
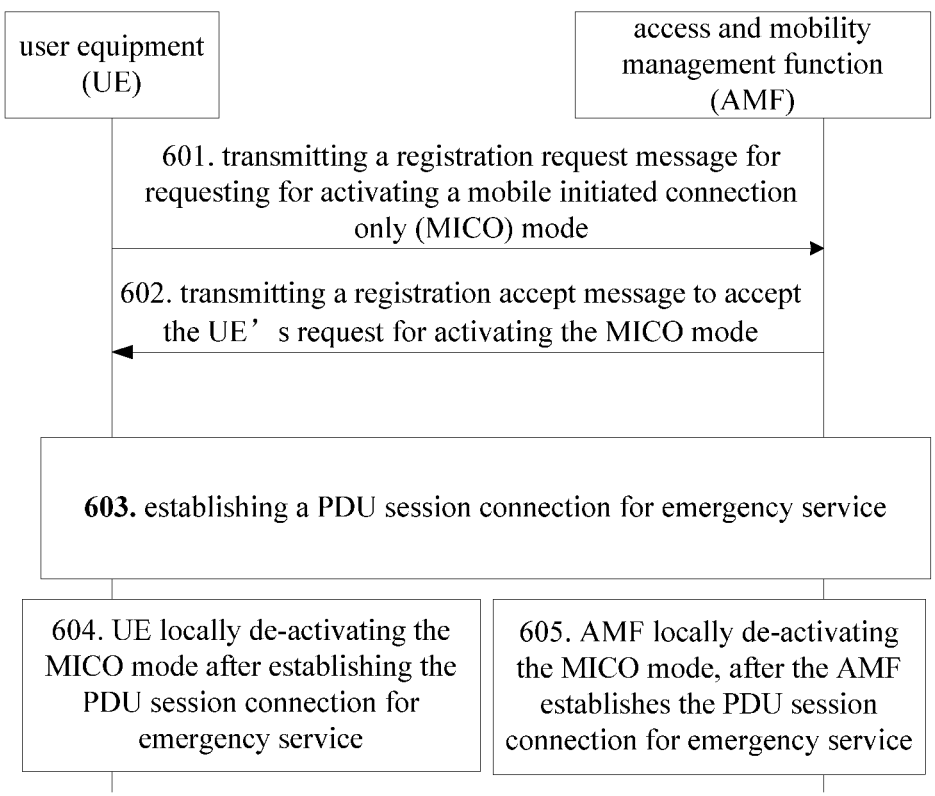
FIG. 6 is a fifth flowchart of a connection control method according to an embodiment of the present disclosure.

Referring to FIG. 6, FIG. 6 is another flowchart of a connection control method according to an embodiment of the present disclosure. The method includes the following steps.

Step 601: a user equipment (UE) transmitting to an access and mobility management function (AMF) a registration request message for requesting for activating a mobile initiated connection only (MICO) mode.

Step 602: the AMF transmitting to the UE a registration accept message to accept the UE's request for activating the MICO mode.

The step 601 and the step 602 are used to negotiate the MICO mode between the UE and the AMF in the registration procedure. After the UE receives the registration accept message including the MICO indication transmitted by the AMF, the MICO Mode negotiation is successful, and both the UE and the AMF activate the MICO mode.

Step 603: the UE and the AMF establishing a PDU session connection for emergency service.

Step 604: the UE locally de-activating the MICO mode after establishing the PDU session connection for emergency service.

Step 605: the AMF locally de-activating the MICO mode for the UE, after the AMF establishes the PDU session connection for emergency service.

After the emergency service session connection is established, if the MICO mode is negotiated to be activated during the most recent registration procedure, the network device de-activates the MICO mode according to the agreement with the UE, thereby preventing the UE and the network device from de-activating the MICO mode through explicit signaling interactions, reducing the number of signaling interactions between the UE and the network device, and improving stability of the system.

Figure 7:
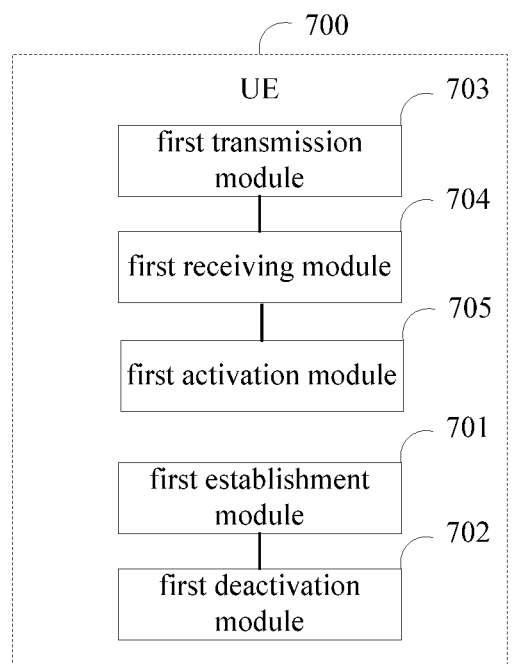
FIG. 7 is a first schematic diagram of a user equipment (UE) according to an embodiment of the present disclosure.

Referring to FIG. 7, FIG. 7 is a schematic diagram of a user equipment (UE) 700 according to an embodiment of the present disclosure. The UE 700 includes:

a first establishment module 701 configured to establish a session connection with a network device; where the session connection may be for emergency services;

a first deactivation module 702 configured to de-activate a mobile initiated connection only (MICO) mode locally at the UE.

With continued reference to FIG. 7, in one embodiment of the present disclosure, optionally, the UE 700 further includes:

a first transmission module 703 configured to transmit a request message to the network device, where the request message is configured to request for activating the MICO mode.

With continued reference to FIG. 7, in one embodiment of the present disclosure, optionally, the UE 700 further includes:

a first receiving module 704 configured to receive an accept message transmitted by the network device; where the accept message indicates that the network device accepts the UE's request for activating the MICO mode;

a first activation module 705 configured to activate the MICO mode locally at the UE.

In one embodiment of the present disclosure, the network device may be an access and mobility management function (AMF).

The UE provided in the embodiments of the present disclosure may execute the above method embodiments, and its implementation principles and technical effects are similar, which will not be elaborated in this embodiment.

Figure 8:
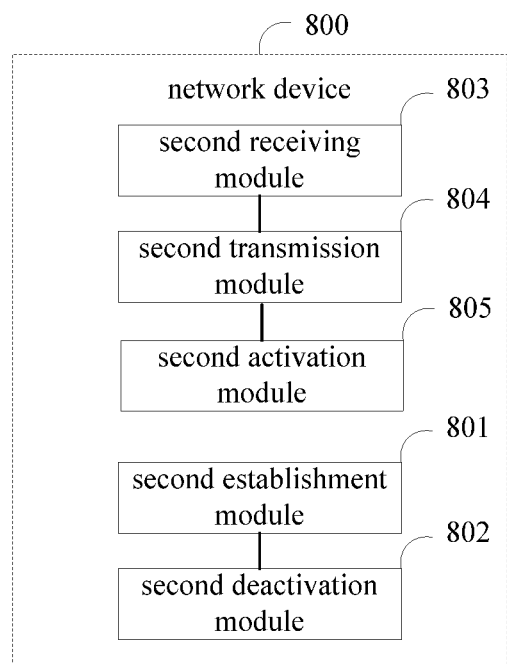
FIG. 8 is a schematic diagram of a network device according to an embodiment of the present disclosure.

Referring to FIG. 8, FIG. 8 is a schematic diagram of a network device 800 according to an embodiment of the present disclosure. The network device 800 includes:

a second establishment module 801 configured to establish a session connection with a user equipment (UE); where the session connection may be for emergency services;

a second deactivation module 802 configured to de-activate a mobile initiated connection only (MICO) mode locally at the network device.

With continued reference to FIG. 8, in one embodiment of the present disclosure, optionally, the network device 800 further includes:

a second receiving module 803 configured to receive a request message transmitted by the UE, where the request message is configured to request for activating the MICO mode.

With continued reference to FIG. 8, in one embodiment of the present disclosure, optionally, the network device 800 further includes:

a second transmission module 804 configured to transmit an accept message to the UE; where the accept message indicates that the network device accepts the UE's request for activating the MICO mode;

a second activation module 805 configured to activate the MICO mode locally at the network device.

In one embodiment of the present disclosure, the network device may be an access and mobility management function (AMF).

The network device provided in the embodiments of the present disclosure may execute the above method embodiments, and its implementation principles and technical effects are similar, which will not be elaborated in this embodiment.

Figure 9:
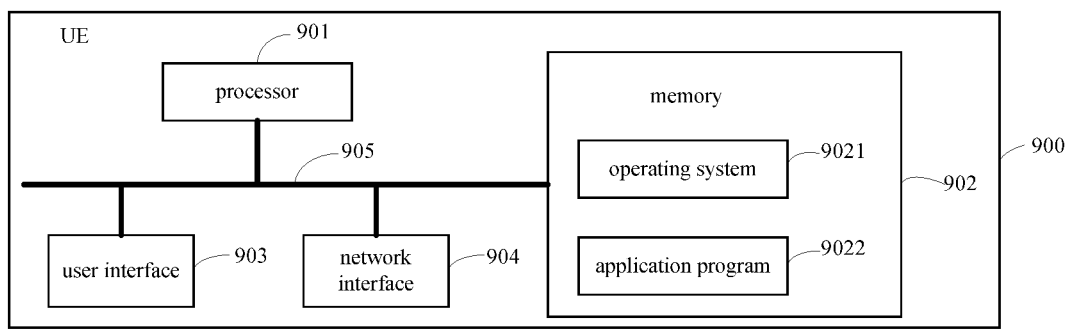
FIG. 9 is a second schematic diagram of a UE according to an embodiment of the present disclosure.

Referring to FIG. 9, a user equipment (UE) 900 shown in FIG. 9 includes: at least one processor 901, at least one memory 902, at least one network interface 904 and at least one user interface 903. Various components in the UE 900 are coupled together via bus system 905. It can be understood by those of skill that the bus system 905 is used to implement connected communication among these components. In addition to a data bus, the bus system 905 further includes: a power bus, a control bus, and a state signal bus. For clear description, various buses in FIG. 9 are not shown independently and are labeled collectively as the bus system 905.

The user interface 903 may include a display device, keyboard or click device (such as a mouse, trackball, touch board or touch screen, etc.).

It can be understood by those of skill that the memory 902 in embodiments of the present disclosure may be a volatile storage or a nonvolatile storage, or a combination of both volatile and non-volatile storage. The nonvolatile storage may be Read Only Memory (ROM), Programmable Read-Only Memory (PROM), Erasable Programmable Read-Only Memory (EPROM), Electrically Erasable Programmable Read-Only Memory (EEPROM) or flash. The volatile storage may be Random Access Memory (RAM), which may be used as an external cache. As an illustrative but not restrictive specification, many forms of RAM are available, such as Static RAM (SRAM), Dynamic RAM (DRAM), Synchronous DRAM (SDRAM), Double Data Rate SDRAM (DDRSDRAM), Enhanced SDRAM (ESDRAM), Synch Link DRAM (SLDRAM) and Direct Rambus RAM (DR-RAM). The memory 902 of the system and method described in embodiments of the present disclosure include, but are not limited to, these and any other suitable types of storages.

In some embodiments, the memory 902 stores the following elements as executable modules, data structures, subsets thereof, or supersets thereof: operating system 9021 and application programs 9022.

The operating system 9021 may include various kinds of system programs, such as a framework layer, a core library layer, and a driver layer, which may be used to implement various kinds of basic services and process hardware-based tasks. The application programs 9022 may include various kinds of application programs, such as Media Player and Browser, which may be used to implement various kinds of application services. Programs, which are used to implement methods in embodiments of the present disclosure, may be included in the program applications 9022.

In embodiments of the present disclosure, programs or instructions stored in the memory 902, or the programs or instructions stored in the application programs 9022, may be called to execute the following steps: establishing a session connection with a network device, where the session connection is for emergency services; de-activating a mobile initiated connection only (MICO) mode locally at the UE.

The UE provided in the embodiments of the present disclosure may execute the above method embodiments, and its implementation principles and technical effects are similar, which will not be elaborated in this embodiment.

Figure 10:
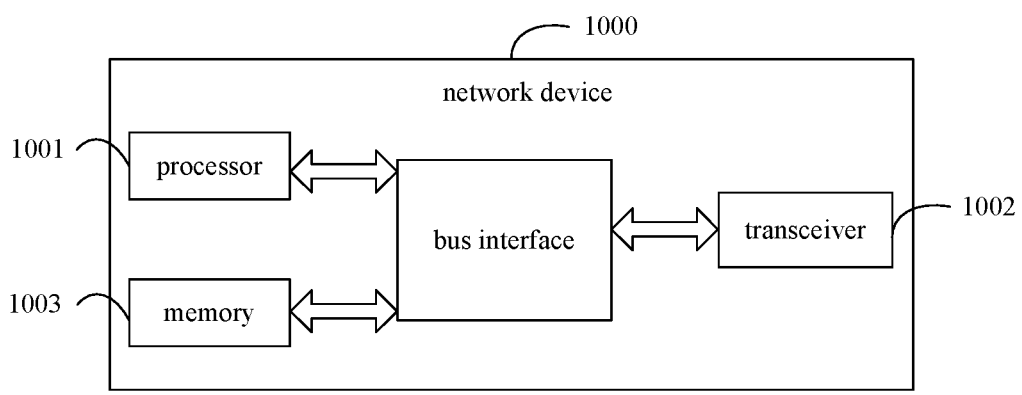
FIG. 10 is a schematic diagram of a network device according to an embodiment of the present disclosure.

Referring to FIG. 10, FIG. 10 is a schematic diagram of a network device according to an embodiment of the present disclosure. As shown in FIG. 10, the network device 1000 includes: a processor 1001, a transceiver 1002, a memory 1003 and a bus interface.

In one embodiment of the present disclosure, the network device 1000 further includes: a computer program stored on the memory 1003 and executable on the processor 1001. The computer program may be executed by the processor 1001 to execute the steps of establishing a session connection with a user equipment (UE), where the session connection is for emergency services; and de-activating a mobile initiated connection only (MICO) mode locally at the network device.

In FIG. 10, the bus architecture may include any number of interconnected buses and bridges (not shown). Various circuits of one or more processors, which are represented by the processor 1001, and one or more memories, which are represented by the memory 1003, may be linked together. The bus interface may link various other circuits, such as a peripheral device, a voltage regulator, and a power management circuit together. These features are well known in this field; therefore, this disclosure does not further describe these features. The bus interface provides an interface. The transceiver 1002 may be multiple elements, including a transmitter and a receiver and provide units, which communicate with other devices on a transmission medium.

The processor 1001 is responsible for managing bus architecture and general processing. The memory 1003 may store data used by the processor 1001 when executing operations.

The network device provided in the embodiments of the present disclosure may execute the above method embodiments, and its implementation principles and technical effects are similar, which will not be elaborated in this embodiment.

The steps of the methods and/or algorithms described in the present disclosure may be implemented by hardware or by executing software instructions with a processor. The software instructions may be composed of corresponding software modules, and the software modules may be stored in RAM, flash memory, ROM, EPROM, EEPROM, registers, hard disk, mobile hard disk, read-only optical disk, or any other form of storage medium known in the art. An exemplary storage medium is coupled to the processor so that the processor can read information from the storage medium and can write information to the storage medium. Of course, the storage medium may also be a component of the processor. The processor and the storage medium may be located in an ASIC. The ASIC may be located in a core network interface device. The processor and the storage medium may also exist as discrete components in the core network interface device.

Those skilled in the art should appreciate that in one or more of the above examples, the functions described in the present disclosure may be implemented by hardware, software, firmware, or any combination thereof. When implemented in software, these functions may be stored in a computer-readable medium or transmitted as one or more instructions or code on the computer-readable medium. Computer-readable media may include a computer storage media and communication media. The communication media includes any medium that facilitates transmission of a computer program from one place to another. The storage medium may be any available medium that may be accessed by a general-purpose or special-purpose computer.

The specific embodiments described above further describe the purpose, technical solutions and beneficial effects of the present disclosure in detail. It should be understood that the foregoing are only specific embodiments of the present disclosure and are not intended to limit the scope of the present disclosure. Any modifications, equivalent replacements, and improvements based on the technical solutions of the present disclosure should be included in the scope of the present disclosure.

Those skilled in the art will appreciate that the disclosed embodiments may be provided as a method, a system, or a computer program product. Thus, the embodiments of the present disclosure may take the form of an entirely hardware embodiment, an entirely software embodiment, or a combination of software and hardware. Moreover, the embodiments of the present disclosure may take the form of a computer program product embodied on one or more computer usable storage media (including but not limited to a disk storage, CD-ROM, an optical storage, etc.) including computer usable program codes.

The present disclosure has been described with reference to the flow charts and/or block diagrams of methods, devices (systems), and computer program products according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor, or any other programmable data processing devices to create a machine, so that instructions executable by the processor of the computer or the other programmable data processing devices may achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It will be apparent that those skilled in the art can make further changes and modifications to the embodiments without departing from the scope of the present disclosure.

What is claimed is:

1. A connection control method, operable by a user equipment (UE), comprising:
   establishing a session connection with a network device; wherein the session connection is for emergency service;
   when the session connection is successfully established, de-activating a mobile initiated connection only (MICO) mode locally directly;
   wherein the UE in the MICO mode does not need to monitor paging during connection management-idle (CM-IDLE), and AMF rejects any request for downlink data transmission for the UE in the MICO mode.

2. The method according to claim 1, wherein before the establishing a session connection with a network device, the method further comprises:
   transmitting a request message to the network device; wherein the request message is configured to request for activating the MICO mode.

3. The method according to claim 2, wherein before the establishing a session connection with a network device, the method further comprises:
   receiving an accept message transmitted by the network device; wherein the accept message indicates that the network device accepts the UE's request for activating the MICO mode;
   activating the MICO mode locally at the UE.

4. The method according to claim 1, wherein the network device is an access and mobility management function (AMF) entity.

5. A computer readable storage medium, comprising a computer program stored thereon; wherein the computer program is executed by a processor to implement steps of the connection control method according to claim 1.

6. The computer readable storage medium according to claim 5, wherein the computer program is executed by the processor to implement steps of:
transmitting a request message to the network device; wherein the request message is configured to request for activating the MICO mode.

7. A connection control method, operable by a network device, comprising:
establishing a session connection with a user equipment (UE); wherein the session connection is for emergency service;
when the session connection is successfully established, de-activating a mobile initiated connection only (MICO) mode locally directly;
wherein the UE in the MICO mode does not need to monitor paging during connection management-idle (CM-IDLE), and AMF rejects any request for downlink data transmission for the UE in the MICO mode.

8. The method according to claim 7, wherein before the establishing a session connection with a user equipment (UE), the method further comprises:
receiving a request message transmitted by the UE; wherein the request message is configured to request for activating the MICO mode.

9. The method according to claim 7, wherein before the establishing a session connection with a user equipment (UE), the method further comprises:
transmitting an accept message to the UE; wherein the accept message indicates that the network device accepts the UE's request for activating the MICO mode;
activating the MICO mode locally at the network device.

10. The method according to claim 7, wherein the network device is an access and mobility management function (AMF) entity.

11. A network device, comprising: a processor, a memory, and a computer program stored on the memory and executable by the processor; wherein the computer program is executed by the processor to implement steps of the connection control method according to claim 7.

12. The network device according to claim 11, wherein the processor is configured to,
receive a request message transmitted by the UE; wherein the request message is configured to request for activating the MICO mode.

13. The network device according to claim 12, wherein the processor is configured to,
transmit an accept message to the UE; wherein the accept message indicates that the network device accepts the UE's request for activating the MICO mode;
activate the MICO mode locally at the network device.

14. The network device according to claim 11, wherein the network device is an access and mobility management function (AMF) entity.

15. A computer readable storage medium, comprising a computer program stored thereon; wherein the computer program is executed by a processor to implement steps of the connection control method according to claim 7.

16. The computer readable storage medium according to claim 15, wherein the computer program is executed by the processor to implement steps of: receiving a request message transmitted by the UE; wherein the request message is configured to request for activating the MICO mode.

17. A user equipment, comprising: a processor, a memory, and a computer program stored on the memory and executable by the processor; wherein the computer program is executed by the processor to implement steps of:
establishing a session connection with a network device; wherein the session connection is for emergency service;
when the session connection is successfully established, de-activating a mobile initiated connection only (MICO) mode locally directly;
wherein the UE in the MICO mode does not need to monitor paging during connection management-idle (CM-IDLE), and AMF rejects any request for downlink data transmission for the UE in the MICO mode.

18. The user equipment according to claim 17, wherein the processor is configured to,
transmit a request message to the network device; wherein the request message is configured to request for activating the MICO mode.

19. The user equipment according to claim 18, wherein the processor is configured to,
receive an accept message transmitted by the network device; wherein the accept message indicates that the network device accepts the UE's request for activating the MICO mode;
activate the MICO mode locally at the UE.

20. The user equipment according to claim 17, wherein the network device is an access and mobility management function (AMF) entity.

* * * * *